US010325569B2

(12) United States Patent
Li et al.

(10) Patent No.: US 10,325,569 B2
(45) Date of Patent: Jun. 18, 2019

(54) METHOD AND APPARATUS FOR CODING IMAGE INFORMATION FOR DISPLAY (71) Applicant: Beijing Xiaomi Mobile Software Co., Ltd., Haidian Street, Beijing (CN)

(72) Inventors: Guosheng Li, Beijing (CN); Dongdong Yang, Beijing (CN); Xiaoxing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/677,883

(22) Filed: Aug. 15, 2017

(65) Prior Publication Data
US 2018/0052337 A1 Feb. 22, 2018

(30) Foreign Application Priority Data

Aug. 16, 2016 (CN) .......................... 2016 1 0677001

(51) Int. Cl.
G09G 5/02 (2006.01)
H04N 1/60 (2006.01)
G09G 5/04 (2006.01)
G06F 13/12 (2006.01)
G02F 1/01 (2006.01)

(52) U.S. Cl.
CPC ........... G09G 5/026 (2013.01); H04N 1/6069 (2013.01); G02F 1/01 (2013.01); G06F 13/124 (2013.01); G09G 5/04 (2013.01)

(58) Field of Classification Search
None
See application file for complete search history.

(56) References Cited

U.S. PATENT DOCUMENTS 7,646,391 B1 * 1/2010 Hayward ............... H04N 1/603
345/589
9,472,162 B2 10/2016 Stauder et al.
2010/0119149 A1 5/2010 Hong et al.
(Continued)

FOREIGN PATENT DOCUMENTS

CN 102156999 A 8/2011
CN 105118026 A 12/2015
(Continued)

OTHER PUBLICATIONS

Extended European search report of European Patent Application No. 17186404.4, from the European Patent office, dated Dec. 20, 2017, 8 pages.
(Continued)

Primary Examiner — Scott A Rogers
(74) Attorney, Agent, or Firm — Arch & Lake LLP (57) ABSTRACT The present disclosure discloses a color gamut mapping method, an apparatus, and a storage medium in the technical field of displaying. The method includes: acquiring at least one color gamut type tag for at least one layer; determining at least one color gamut corresponding to the at least one layer, based on the at least one color gamut type tag; for each layer, mapping the layer to a corresponding color gamut by using a color gamut mapping method corresponding to the color gamut type; and superimposing the at least one layer that is mapped to the at least one corresponding color gamut so as to form and output an image to be displayed.

13 Claims, 6 Drawing Sheets (56) References Cited

U.S. PATENT DOCUMENTS

| | | |
|---|---|---|
| 2012/0313956 A1 | 12/2012 | Zhou et al. |
| 2015/0179135 A1 | 6/2015 | Stauder et al. |
| 2015/0304665 A1 | 10/2015 | Hannuksela |
| 2016/0029520 A1 | 1/2016 | Finch et al. |
| 2017/0032725 A1 | 2/2017 | Li et al. |

FOREIGN PATENT DOCUMENTS

| | | | |
|---|---|---|---|
| CN | 105141806 A | | 12/2015 |
| CN | 105261326 A | | 1/2016 |
| EP | 2887634 A1 | | 6/2015 |
| JP | 200517674 A | | 1/2005 |
| JP | 2008293462 A | | 12/2008 |
| RU | 2013150934 A | | 5/2015 |
| WO | 2012142589 A2 | | 10/2012 |
| WO | 2015076616 A1 | | 5/2015 |

OTHER PUBLICATIONS

Russian First Office Action issued in corresponding RU Application No. 2017121651 dated Jun. 28, 2018, 8 pages.
International Search Report and Written Opinion issued in corresponding International Application No. PCT/CN2016/110861, dated Mar. 30, 2017, 12 pages.
First JP Office Action (including English translation) issued in corresponding Japanese Application No. 2017-527795 dated Nov. 27, 2018, 6 pages.

\* cited by examiner

METHOD AND APPARATUS FOR CODING IMAGE INFORMATION FOR DISPLAY

CROSS-REFERENCE TO RELATED APPLICATION

This application is based on and claims priority of Chinese Patent Application No. 201610677001.9, filed on Aug. 16, 2016, the entire contents of which are incorporated herein by reference in its entirety.

TECHNICAL FIELD

The present disclosure generally relates to the technical field of displaying, and more particularly to a color gamut mapping method, apparatus and a storage medium.

BACKGROUND

A color gamut may refer to a method for color coding, and may also refer to a whole set of colors a display system can produce. For instance, there exist sRGB (standard Red Green Blue) color gamut coding and NTSC (National Television Standards Committee) color gamut coding. In a color gamut mapping method, a terminal may map an image to be displayed to the sRGB color gamut for displaying when a user wants to view more accurate colors, and may map the image to be displayed to the NTSC color gamut for displaying when the user wants to view more bright colors.

SUMMARY

The present disclosure provides a color gamut mapping method, an apparatus and a storage medium.

According to a first aspect of the present disclosure, a color gamut mapping method is provided. The method may include: acquiring at least one color gamut type tag for at least one layer where the color gamut type tag may be added when the at least one layer is generated; determining at least one color gamut corresponding to the at least one layer based on the at least one color gamut type tag; mapping the at least one layer to the at least one corresponding color gamut; and superimposing the at least one layer that is mapped to the at least one corresponding color gamut so as to form and output an image to be displayed.

According to a second aspect of the present disclosure, a color gamut mapping apparatus is provided. The apparatus may include: a processor; and a memory storing instructions executable by the processor. The processor may be configured to: acquire at least one color gamut type tag for at least one layer where the color gamut type tag may be added when the layer is generated; determine at least one color gamut corresponding to the at least one layer based on the at least one color gamut type tag; map the at least one layer to the at least one corresponding color gamut; and superimpose the at least one layer that is mapped to the at least one corresponding color gamut so as to form and output an image to be displayed.

According to a third aspect of the present disclosure, there is provided a non-transitory computer-readable storage medium having stored therein instructions that, when executed by a processor of a mobile terminal, may cause the mobile terminal to perform: acquiring at least one color gamut type tag for at least one layer where the color gamut type tag may be added when the layer is generated; determining at least one color gamut corresponding to the at least one layer based on the at least one color gamut type tag; mapping the at least one layer to the at least one corresponding color gamut; and superimposing the at least one layer that is mapped to the at least one corresponding color gamut, so as to form and output an image to be displayed.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to exemplary embodiments, examples of which are illustrated in the accompanying drawings. The following description refers to the accompanying drawings in which the same numbers in different figures represent the same or similar elements unless otherwise indicated. The implementations set forth in the following description of embodiments do not represent all implementations consistent with the disclosure. Instead, they are merely examples of apparatuses and methods consistent with aspects related to the disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise.

It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

In a color gamut mapping method, a terminal may map an image to be displayed to the sRGB color gamut for displaying when a user wants to view more accurate colors, and may map the image to be displayed to the NTSC color gamut for displaying when the user wants to view more bright colors. In general, a single color gamut mapping method may be adopted for each frame of image displayed by a terminal. A displayed frame of image may be usually obtained by superimposing multiple layers.

However, not all layers of the frame suit the same color gamut. For example, a lock screen interface of a smart phone may include: a status bar layer, a wallpaper layer and a desktop icon layer. The status bar layer and the desktop icon layer may belong to a User Interface (UI) layer, which may be an artificially designed layer and originally may have a favorable display effect. Therefore, aesthetic beauty of the UI layer may be adversely affected instead if improper color gamut mapping is performed on the UI layer. As such, it is needed to solve the problem that some layers exhibit poor display effects when using a single color gamut to display each frame of image in the terminal.

Figure 1:
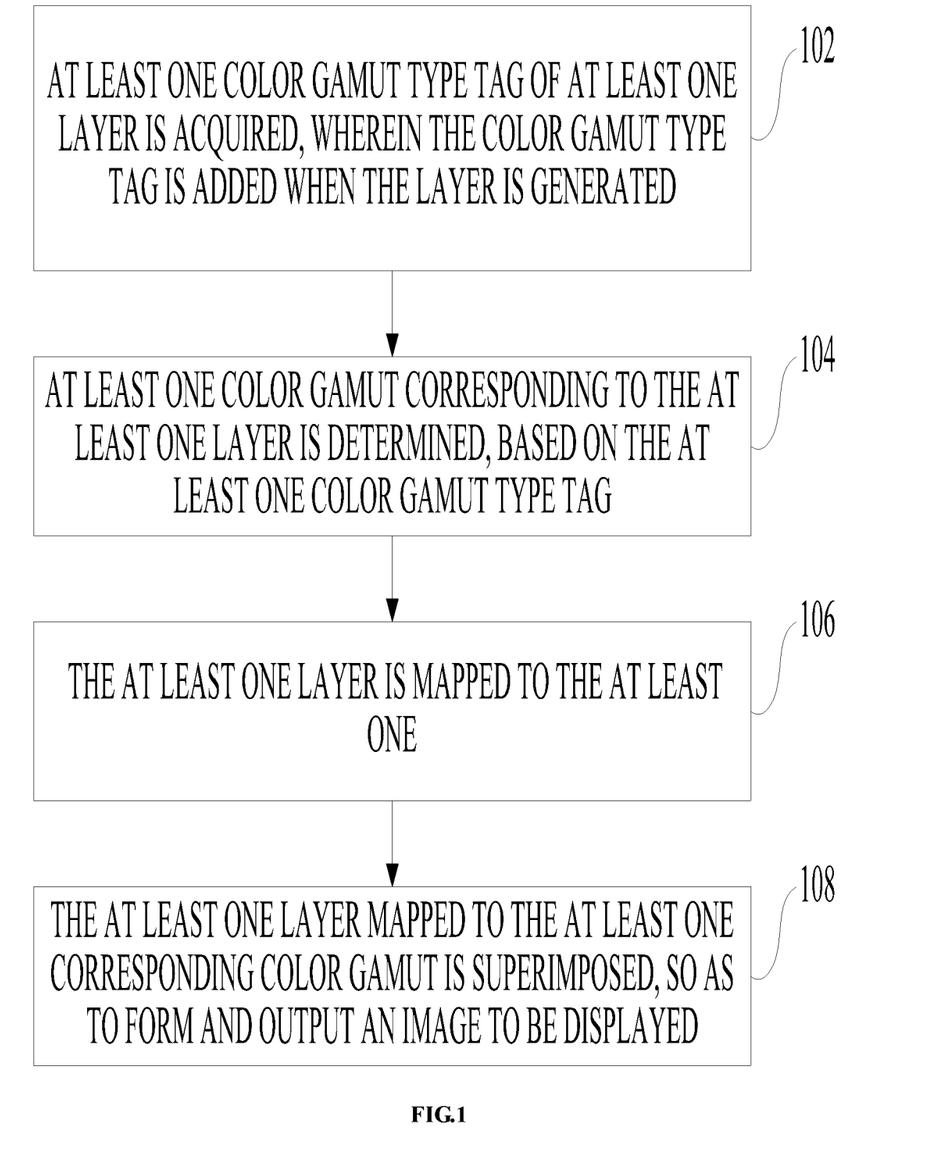
FIG. 1 is a flowchart illustrating a color gamut mapping method according to an exemplary embodiment.

FIG. 1 is a flowchart illustrating a color gamut mapping method according to an exemplary embodiment. The embodiment is described by taking an example where the method is implemented in a terminal having an image processing capability. The method may include the following steps.

At step 102, at least one color gamut type tag of at least one layer is acquired, where the color gamut type tag is added when the layer is generated.

At step 104, at least one color gamut corresponding to the at least one layer is determined based on the at least one color gamut type tag.

At step 106, the at least one layer is mapped to the at least one corresponding color gamut.

At step 108, the at least one layer mapped to the at least one corresponding color gamut is superimposed, so as to form and output an image to be displayed.

In conclusion, by acquiring at least one color gamut type tag of at least one layer, determining at least one color gamut corresponding to the at least one layer based on the at least one color gamut type tag, mapping the at least one layer to the at least one corresponding color gamut, and superimposing the at least one layer mapped to the at least one corresponding color gamut so as to form and output an image to be displayed, the color gamut mapping method provided by the embodiment solves the problem that some layers of an image to be displayed in a terminal exhibit poor display effects when using a single color gamut to display each frame of image, and achieves the effect that different layers of each image to be displayed in the terminal are mapped to different color gamuts according to different color gamut types so that each layer exhibits a desired display effect.

Thus, comparing with other methods, the present disclosure discloses more accurate colors that are available for a natural layer and more bright colors that are available for a UI layer. The overall display effect of the terminal is thereby enhanced.

Figure 2:
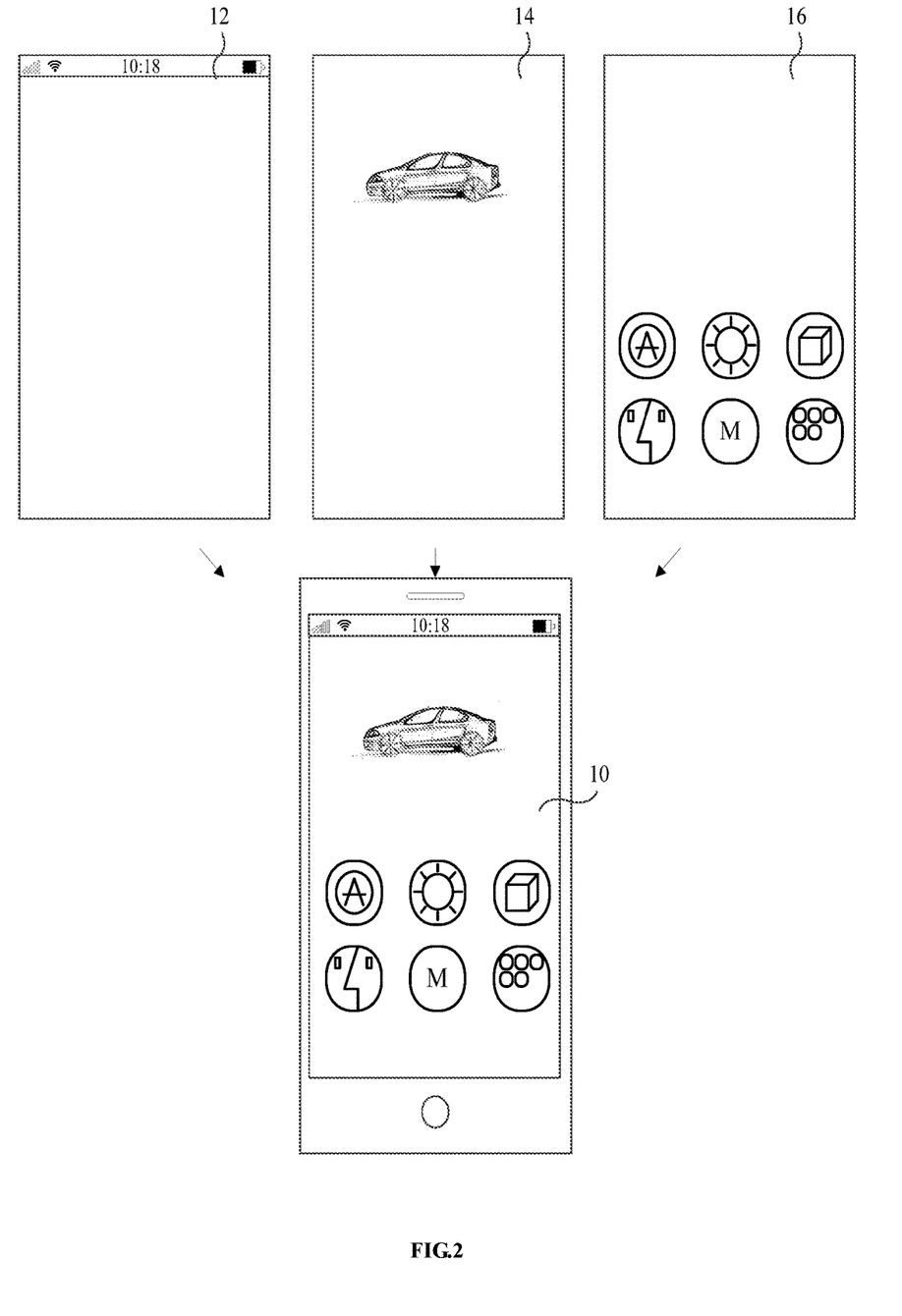
FIG. 2 is a schematic diagram illustrating a layered structure of a displayed image according to an exemplary embodiment.

FIG. 2 is a schematic diagram illustrating a layered structure of a displayed frame of image 10 according to an exemplary embodiment. The displayed image 10 is a homepage of a handset. The homepage of the handset may include the following three layers: a status bar layer 12, a desktop icon layer 14 and a wallpaper layer 16. The status bar layer 12 may be located as the uppermost layer, the desktop icon layer 14 may be located as the intermediate layer, and the wallpaper layer 16 may be located as the lowest layer. When an upper layer is a non-transparent layer, it may block its lower layer from being seen. A superimposing order of layers may be determined by z-order values corresponding to the layers. A z-order may refer to a hierarchical relationship between layers (also known as displayed objects). Typically, a layer corresponding to a higher z-order value may be placed as an upper layer of a layer corresponding to a lower z-order value.

In a terminal, the displayed image 10 may be obtained by synthesizing the above three layers. Sources of the layers may be the same or different.

Optionally, from the software perspective, sources of layers may include a desktop application software (APP), a status APP, a wallpaper APP, a third party APP, etc. The layers from the applications may be synthesized as a finally displayed image by an image synthesizing program in the operating system. Optionally, in the Android system, the SurfaceFlinger layer is responsible for synthesizing of layers.

Optionally, from the hardware perspective, sources of layers may include at least one of a Central Processing Unit (CPU), a Graphics Processing Unit (GPU) and a video decoder chip. These layers may be synthesized in an Application Processor (AP) and then may be outputted to a display screen for displaying.

Optionally, each layer may be classified as a natural layer or a UI layer. The natural layer may refer to a layer generated based on naturally existing objects, or a layer generated by simulating the naturally existing objects. A typical natural layer may include: a layer obtained by photographing with a camera, a layer frame acquired by video decoding, a layer in the virtual world which may be rendered in real time by a game rendering engine, etc. The UI layer may refer to a layer for human-machine interaction. Generally, the UI layer is artificially designed. For different layer types, different color gamuts are suitable to be used. For instance, the NTSC color gamut may be suitable for the natural layer, and the sRGB color gamut may be suitable for the UI layer.

Figure 3:
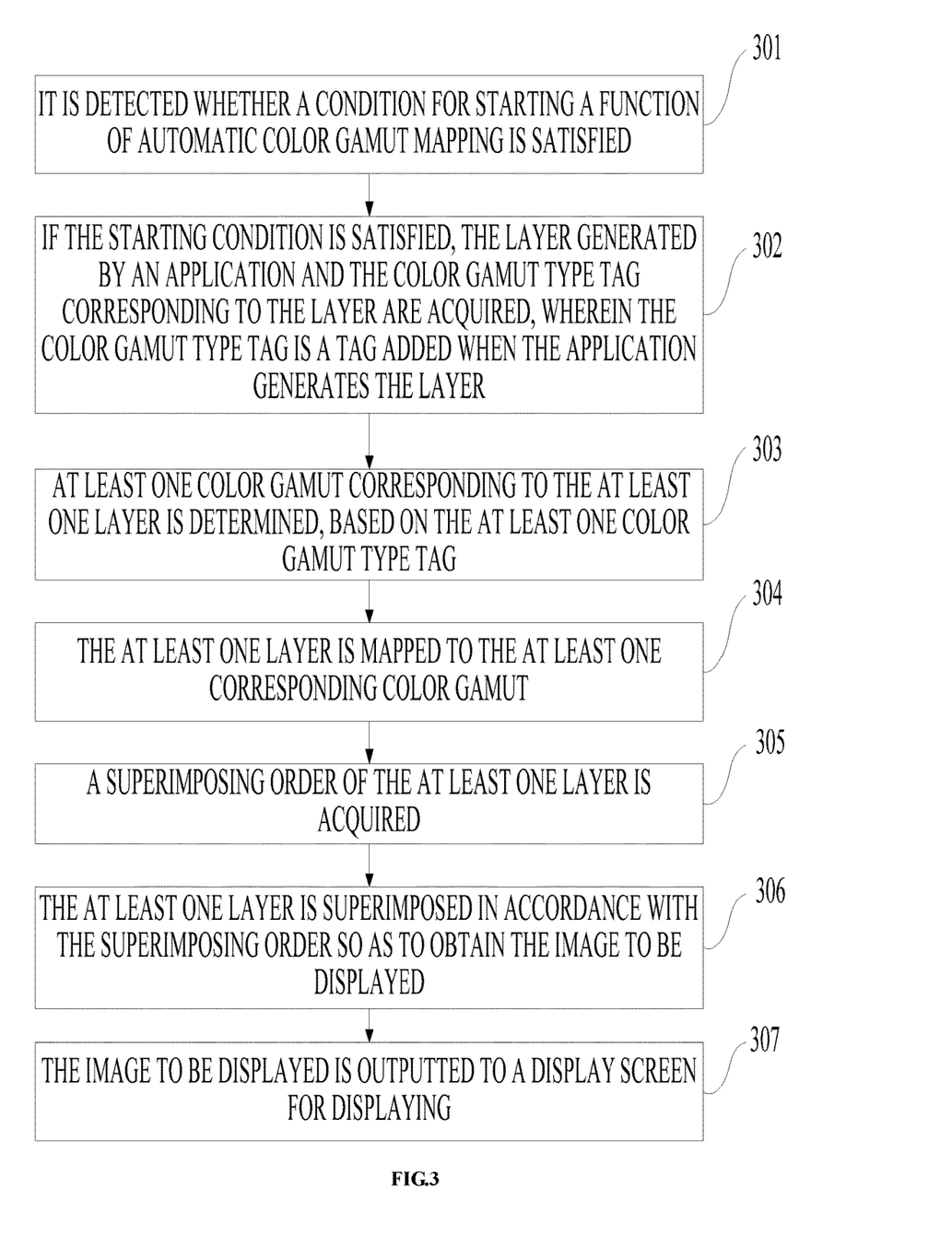
FIG. 3 is a flowchart illustrating a color gamut mapping method according to another exemplary embodiment.

FIG. 3 is a flowchart illustrating a color gamut mapping method according to an exemplary embodiment. The embodiment is described by taking an example where the method is implemented in a terminal. The method may include the following steps.

At step 301, it is detected whether a condition for starting a function of automatic color gamut mapping is satisfied.

Optionally, the condition for starting the function of automatic color gamut mapping includes but is not limited to at least one of the following conditions.

Condition 1: when an appointed application, such as a media player program, starts.

Condition 2: when the function of automatic color gamut mapping is set to be enabled by a user.

If the starting condition is satisfied, step 302 is proceeded to. If the starting condition is not satisfied, no processing is performed and color gamuts of the screen itself or color gamuts currently used by the operating system may be used.

At step 302, if the starting condition is satisfied, the layer generated by an application and the color gamut type tag corresponding to the layer are acquired where the color gamut type tag is a tag added when the application generates the layer.

During normal operation of the terminal, each application generates a layer. For instance, a desktop APP generates an icon layer, a wallpaper APP generates a wallpaper layer, and a status bar APP generates a status bar layer.

Optionally, each application further generates a color gamut type tag corresponding to the layer based on contents of the layer.

For instance, an icon layer may include icons of multiple APPs. As all the icons may be artificially designed UI icons, the desktop APP may generate a color gamut type tag "Tag1" corresponding to the icon layer. For another instance, as the wallpaper layer is a photograph of a natural landscape, the wallpaper APP may generate a color gamut type tag "Tag2" corresponding to the wallpaper layer. For yet another instance, as the status bar layer is an artificially designed UI layer, the status bar APP may generate the color gamut type tag "Tag1" corresponding to the status bar layer. As such, three color gamut type tages may be generated that correspond to contents of the icon layer, the wallpaper layer and the status bar layer.

An image synthesizer or an image synthesizing program in the terminal may acquire the layer generated by each application and the color gamut type tag corresponding to the layer.

At step 303, at least one color gamut corresponding to the at least one layer is determined based on the at least one color gamut type tag.

For example, when the color gamut type tag of the icon layer is "Tag1," the color gamut corresponding to the icon layer may be determined as the sRGB color gamut. When the color gamut type tag of the wallpaper layer is "Tag2," the color gamut corresponding to the wallpaper layer may be determined as the NTSC color gamut.

At step 304, the at least one layer may be mapped to the at least one corresponding color gamut.

For example, the terminal may map the at least one layer to the at least one corresponding color gamut, respectively.

For instance, when the color gamut corresponding to the layer is a sRGB color gamut, the terminal may map the layer to the sRGB color gamut. For another instance, when the color gamut corresponding to the layer is an NTSC color gamut, the terminal may map the layer to the NTSC color gamut.

At step 305, a superimposing order of the at least one layer may be acquired.

The terminal may also acquire a z-order value of each layer, and may determine a superimposing order of layers based on the z-order value of each layer. Typically, a layer corresponding to a higher z-order value may be placed as an upper layer of a layer corresponding to a lower z-order value.

At step 306, the at least one layer may be superimposed in accordance with the superimposing order so as to obtain the image to be displayed.

The terminal may superimpose layers in accordance with the superimposing order to obtain a frame of image to be displayed. Each frame of image to be displayed may be obtained by superimposing at least one layer of the frame of image.

At step 307, the image to be displayed may be outputted to a display screen for displaying.

The terminal may output the image to be displayed to its display screen for displaying.

In conclusion, by acquiring at least one color gamut type tag of at least one layer, determining at least one color gamut corresponding to the at least one layer based on the at least one color gamut type tag, mapping the at least one layer to the at least one corresponding color gamut, and superimposing the at least one layer mapped to the at least one corresponding color gamut so as to form and output an image to be displayed, the color gamut mapping method provided by the embodiment solves the problem that some layers of an image to be displayed in the terminal exhibit poor display effects when using a single color gamut to display each frame of image, and achieves the effect that different layers of each image to be displayed in the terminal are mapped to different color gamuts according to different color gamut types so that each layer exhibits a desired display effect. As a result, more accurate colors may be available for a natural layer and more bright colors may be available for a UI layer, the overall display effect of the terminal may be thereby enhanced.

As non-transparent pixels of an upper layer may block pixels of lower layers, some areas in the lower layers may not be presented to users eventually. In other words, a layer may have its whole displaying area as an effective displaying area, or a layer may include an effective displaying area and an ineffective displaying area. The effective displaying area may appear in the displayed image eventually, and the ineffective displaying area may not be appear in the image. In order to reduce the amount of computation, the present disclosure further provides the following examples.

Figure 4:
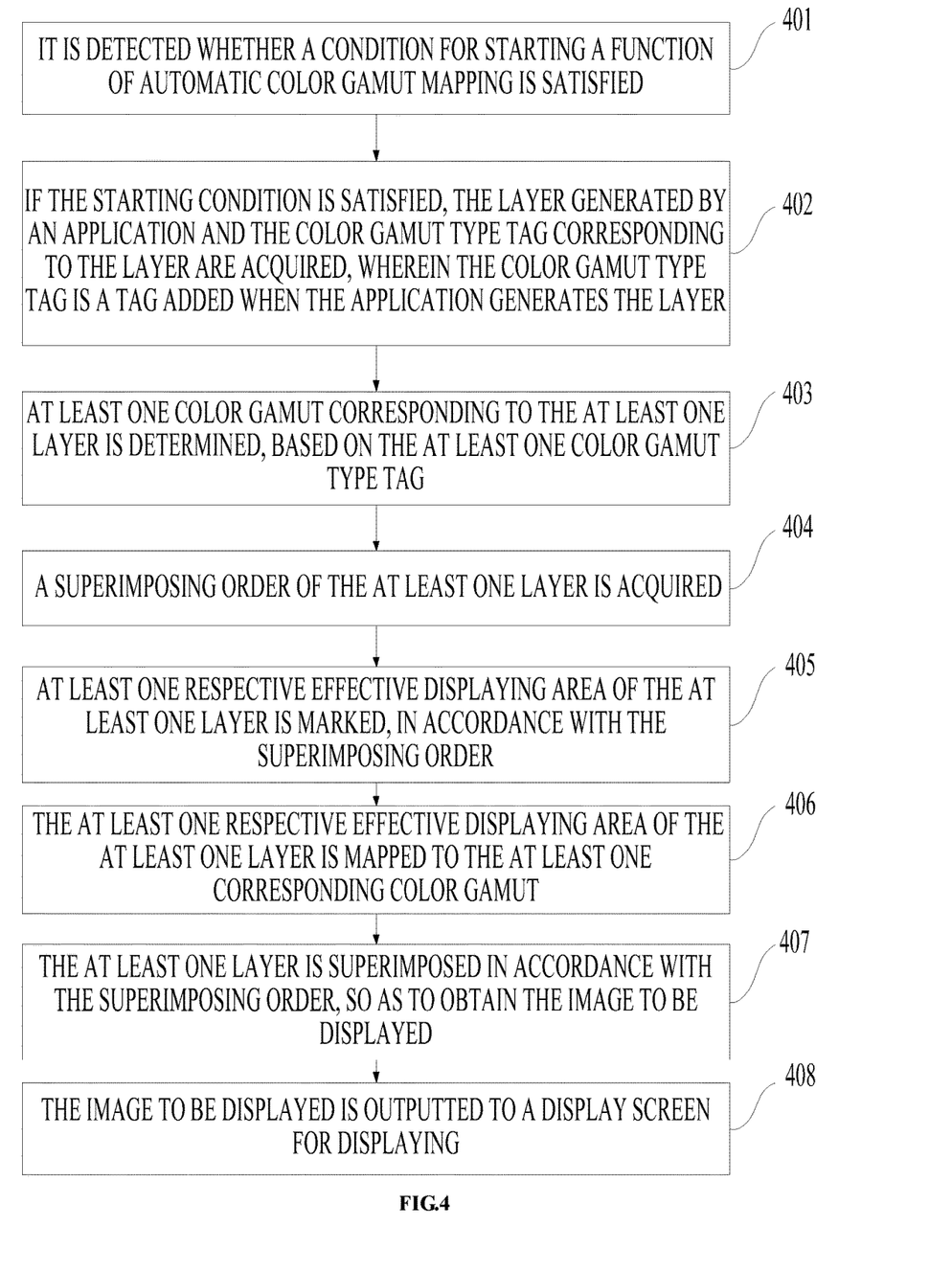
FIG. 4 is a flowchart illustrating a color gamut mapping method according to yet another exemplary embodiment.

FIG. 4 is a flowchart illustrating a color gamut mapping method according to an exemplary embodiment. The embodiment is described by taking an example where the method is implemented in a terminal. The method may include the following steps.

At step 401, it is detected whether a condition for starting a function of automatic color gamut mapping is satisfied.

Optionally, the condition for starting the function of automatic color gamut mapping includes but is not limited to at least one of the following conditions.

Condition 1: when an appointed application, such as a media player program, starts.

Condition 2: when the function of automatic color gamut mapping is set to be enabled by a user.

If the starting condition is satisfied, step 402 is proceeded to. If the starting condition is not satisfied, no processing is performed and color gamuts of the screen itself or color gamuts currently used by the operating system may be used.

At step 402, if the starting condition is satisfied, the layer generated by an application and the color gamut type tag corresponding to the layer are acquired where the color gamut type tag may be a tag added when the application generates the layer.

During normal operation of the terminal, each application may generate a layer. For instance, a desktop APP generates an icon layer, a wallpaper APP generates a wallpaper layer, and a status bar APP generates a status bar layer.

Optionally, each application may further generate a color gamut type tag corresponding to the layer based on contents of the layer.

For instance, an icon layer includes icons of multiple APPs. As all the icons are artificially designed UI icons, the desktop APP may generate a color gamut type tag "Tag1" corresponding to the icon layer. As the wallpaper layer is a photograph of a natural landscape, the wallpaper APP may generate a color gamut type tag "Tag2" corresponding to the wallpaper layer. As the status bar layer may be an artificially designed UI layer, the status bar APP generates the color gamut type tag "Tag1" corresponding to the status bar layer. As such, three color gamut type tages may be generated that correspond to contents of the icon layer, the wallpaper layer and the status bar layer.

An image synthesizer or an image synthesizing program in the terminal may acquire the layer generated by each application and the color gamut type tag corresponding to the layer.

At step 403, at least one color gamut corresponding to the at least one layer is determined based on the at least one color gamut type tag.

For example, when the color gamut type tag of the icon layer is "Tag1," the color gamut corresponding to the icon layer may be determined as the sRGB color gamut. When the color gamut type tag of the wallpaper layer is "Tag2," the color gamut corresponding to the wallpaper layer may be determined as the NTSC color gamut.

The map between the color gamut type tag and the the color gamut may be pre-determined or may be set by the user dynamically via a user interface. For example, a pre-determined map to illustrate the relationship between "Tag1" and the sRGB color gamut may be stored in the terminal, and such map may be retrieved and becomes available when the the color gamut type tag for a particular layer is determined. Sometimes, a user may be provided with a user interface to allow the user to enter a map to illustrate the relationship between "Tag2" and a color gamut. The user may enter the map of "Tag2" and the NTSC color gamut by using the user interface dynamically.

At step 404, a superimposing order of the at least one layer is acquired.

The terminal may also acquire a z-order value of each layer, and may determine a superimposing order of layers based on the z-order value of each layer. Typically, a layer corresponding to a higher z-order value may be placed as an upper layer over a layer corresponding to a lower z-order value.

At step 405, at least one respective effective displaying area of the at least one layer may be marked in accordance with the superimposing order.

Optionally, the effective displaying area of each layer may be referred as the current layer's area which may not covered by its upper layers. In other words, the effective displaying area of each layer may be referred as the area displayed in the image.

Layers may be superimposed in accordance with their z-order values. When upper pixels in an upper layer are non-transparent, lower pixels in a lower layer which are located right under the upper pixels may be blocked and thus may not be presented eventually in the displayed image.

The terminal may mark the effective displaying area of each layer in accordance with the superimposing order of layers. Optionally, when a layer is an uppermost layer, the whole area of the layer may be marked as an effective displaying area. When a layer is not an uppermost layer, at least one upper layer of this layer is acquired. Pixel positions in the layer which correspond to non-transparent pixels in the at least one upper layer are marked. The marked pixels may be a first pixel set, and other pixels in this layer that are not in the first pixel set are a second pixel set. The second pixel set is determined as an effective displaying area.

Sometimes, the first pixel set and the second pixel set may be changed from time to time. For example, when an icon displayed in an uppermost layer is changed to be a non-display icon, pixels directly underneath this icon in the next layer may need to be removed from the first pixel set and may be added to the second pixe set. The area covered by those pixels may be changed from non-displaying area to be the effective displaying area.

Sometimes, the first pixel set and the second pixel set may be changed dynamically. For example, when an icon in the uppermost is a moving icon and may be moved from one position to another position when it is displayed, the pixels directly underneath this icon in the next layer may be moved between the first pixel set and the second pixel set dynamically while the icon in the uppermost layer is moving. Sometimes, in order for simplifying the process, pixels directly underneath this icon in the next layer may be obtained and those pixels may cover various locations that are directly underneath where the icon in the uppermost layer may possibly move to. Those pixels may be placed in the second pixel set. Thus, the areas covered by those pixels in the whole underneath layer may be simply determined as the effective display area.

As shown above, two different types of color gamut may be applied to different areas in one layer. The pixels in the second pixel set which are for the effective display area may be applied with one type of color gamut and the pixels in the first pixel set which are for the non-display area may not be applied with any type of color gamut.

However, sometimes, different areas in different layers may be grouped together for the color gamut. For example, an icon in the uppermost layer may be applied with the sRGB color gamut, also, an effective display area in one or more layers underneath the uppermost layer may also be suitable for applying with sRGB color gamut. In this scenario, the icon in the uppermost layer and the effective display area in the layer underneath may be grouped together for applying with sRGB color gamut.

At step 406, the at least one effective displaying area of the at least one layer may be mapped to the at least one corresponding color gamut.

For example, the terminal may map the effective displaying area of a layer to its corresponding color gamut. For instance, when the color gamut corresponding to the layer is an sRGB color gamut, the terminal may map the effective displaying area of the layer to the sRGB color gamut. For another instance, when the color gamut corresponding to the layer is an NTSC color gamut, the terminal may map the effective displaying area of the layer to the NTSC color gamut.

It is to be noted that, the steps 404 and 405 are optional steps. When the effective displaying area of each layer is not determined, the whole displaying area of each layer may be directly mapped to the color gamut corresponding to the layer at step 406.

At step 407, the at least one layer is superimposed in accordance with the superimposing order so as to obtain the image to be displayed.

The terminal may superimpose layers in accordance with the superimposing order to obtain a frame of image to be displayed. Each frame of image to be displayed may be obtained by superimposing the at least one layer of the frame of image.

At step 408, the image to be displayed may be outputted to a display screen for displaying.

The terminal may output the image to be displayed to a display screen for displaying.

It is to be noted that, specific examples of the color gamut type tag and the color gamut mentioned in embodiments of the present disclosure are given only for facilitating understanding of the embodiments, and do not constitute a limitation on the color gamut type label and the color gamut.

In conclusion, by acquiring at least one color gamut type tag of at least one layer, determining at least one color gamut corresponding to the at least one layer based on the at least one color gamut type tag, mapping the at least one layer to the at least one corresponding color gamut, and superimposing the at least one layer mapped to the at least one corresponding color gamut so as to form and output an image to be displayed, the color gamut mapping method provided by the embodiment solves the problem that some layers of an image to be displayed in a terminal exhibit poor display effects when using a single color gamut to display each frame of image. The effect that different layers of each image to be displayed in the terminal are mapped to different color gamuts according to different color gamut types is achieved. Each layer may exhibit a desired display effect. As a result, more accurate colors may be available for a natural layer and more bright colors may be available for a UI layer, the overall display effect of the terminal may thereby enhanced.

Furthermore, by performing mapping only for the effective displaying area of each layer, the color gamut mapping method provided by the embodiment enables the amount of computation of a terminal to be reduced and enables the computation of the terminal during the color gamut mapping to be accelerated. Thus, it is possible for the terminal to perform color gamut mapping merely for the effective displaying area of each layer.

Apparatus embodiments of the present disclosure which can perform the method embodiments of the present disclosure are as follows. For details not disclosed in the apparatus embodiments of the present disclosure, reference can be made to method embodiments of the present disclosure.

Figure 5:
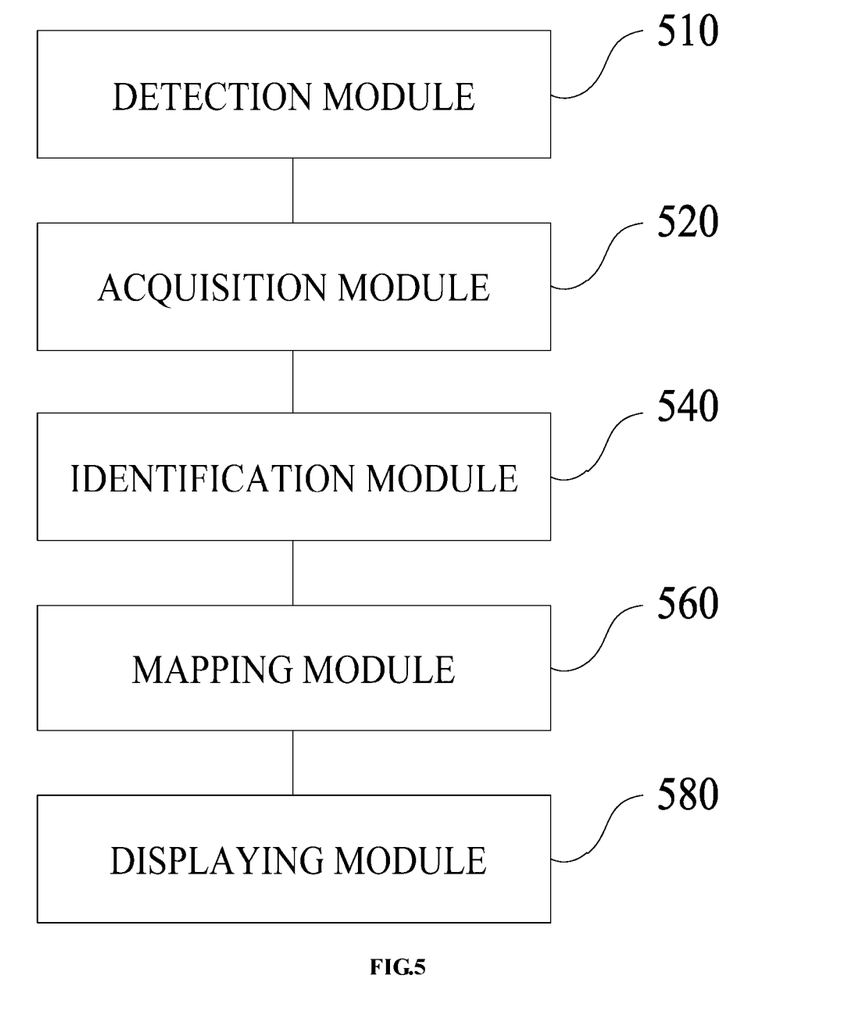
FIG. 5 is a block diagram illustrating a color gamut mapping apparatus according to an exemplary embodiment.

FIG. 5 is a block diagram illustrating a structure of a color gamut mapping apparatus according to an exemplary embodiment. The color gamut mapping apparatus may be implemented, by specific-purpose hardware circuits and/or a combination of software and hardware, as the entirety or a part of a terminal having an image processing capability. The apparatus may include an acquisition module 520, an identification module 540, a mapping module 560 and a displaying module 580.

The acquisition module 520 may be configured to acquire at least one color gamut type tag of at least one layer where the color gamut type tag may be added when the layer is generated.

The identification module 540 may be configured to determine at least one color gamut corresponding to the at least one layer, based on the at least one color gamut type tag.

The mapping module 560 may be configured to map the at least one layer to the at least one corresponding color gamut.

The displaying module 580 may be configured to superimpose the at least one layer mapped to the at least one corresponding color gamut so as to form and output an image to be displayed.

In an optional embodiment, the mapping module 560 may include: an acquisition sub-module that may be configured to acquire a superimposing order of the at least one layer; a marking sub-module configured to mark at least one respective effective displaying area of the at least one layer in accordance with the superimposing order; and a mapping sub-module that may be configured to map the at least one respective effective displaying area of the at least one layer to the at least one corresponding color gamut.

In an optional embodiment, the displaying module 580 may be configured to superimpose the at least one layer in accordance with the superimposing order so as to obtain the image to be displayed; and output the image to be displayed to a display screen for displaying.

In an optional embodiment, the acquisition module 520 may be configured to acquire the layer generated by an application and the color gamut type tag corresponding to the layer where the color gamut type tag may be a tag added when the application generates the layer.

In an optional embodiment, the apparatus further may include: a detection module 510 configured to detect whether a condition for starting a function of automatic color gamut mapping is satisfied; and an acquisition module 520 configured to acquire the color gamut type tag of the layer when the triggering condition is satisfied.

In conclusion, by acquiring at least one color gamut type tag of at least one layer, determining at least one color gamut corresponding to the at least one layer based on the at least one color gamut type tag, mapping the at least one layer to the at least one corresponding color gamut, and superimposing the at least one layer mapped to the at least one corresponding color gamut so as to form and output an image to be displayed, the color gamut mapping apparatus provided by the embodiment solves the problem that some layers of an image to be displayed in a terminal exhibit poor display effects when using a single color gamut to display each frame of image. Thus, the effect that different layers of each image to be displayed in the terminal are mapped to different color gamuts according to different color gamut types is achieved so that each layer exhibits a desired display effect. As a result, more accurate colors may be available for a natural layer and more bright colors may be available for a UI layer, the overall display effect of the terminal may be thereby enhanced.

Furthermore, by performing mapping only for the effective displaying area of each layer, the color gamut mapping apparatus provided by the embodiment enables the amount of computation of a terminal to be reduced and enables the computation of the terminal during the color gamut mapping to be accelerated. Thus, it is possible for the terminal to perform color gamut mapping merely for the effective displaying area of each layer.

As to the apparatus in the above embodiments, the specific manners for respective modules to perform operations have been described in detail in embodiments related to the methods, and may not be elaborated herein.

An exemplary embodiment of the present disclosure provides a color gamut mapping apparatus which can implement the color gamut mapping method provided by the present disclosure. The color gamut mapping apparatus may include: a processor; and a memory storing instructions executable by the processor. The processor may be configured to: acquire at least one color gamut type tag of at least one layer, where the color gamut type tag may be added when the layer is generated; determine at least one color gamut corresponding to the at least one layer based on the at least one color gamut type tag; map the at least one layer to the at least one corresponding color gamut; and superimpose the at least one layer mapped to the at least one corresponding color gamut so as to form and output an image to be displayed.

Figure 6:
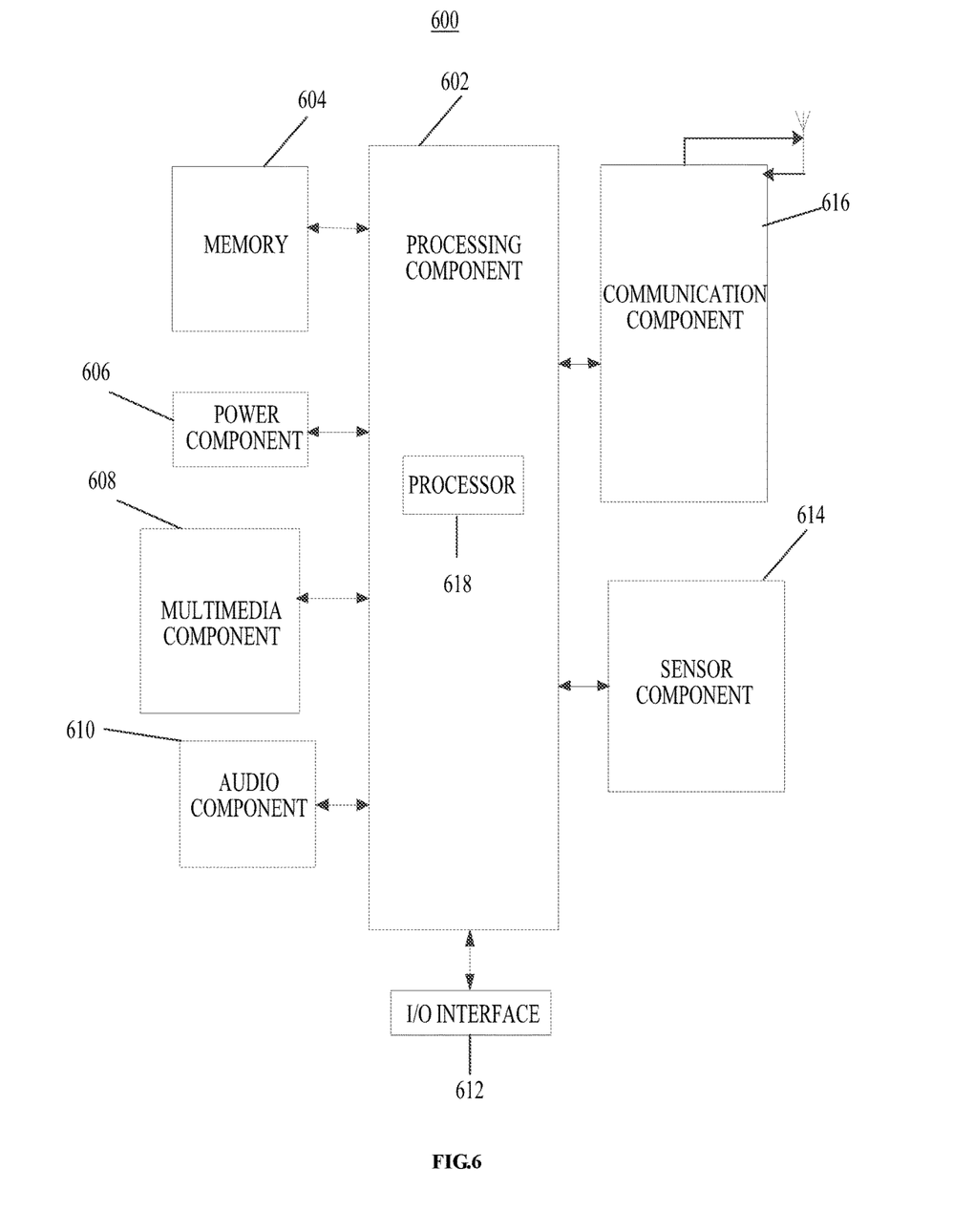
FIG. 6 is a block diagram illustrating a color gamut mapping apparatus according to another exemplary embodiment.

FIG. 6 is a block diagram illustrating a color gamut mapping apparatus according to an exemplary embodiment. For example, the apparatus 600 may be a mobile phone, a computer, a digital broadcast terminal, a messaging device, a gaming console, a tablet, a medical device, exercise equipment, a personal digital assistant or the like.

Referring to FIG. 6, the apparatus 600 may include one or more of the following components: a processing component 602, a memory 604, a power component 606, a multimedia component 608, an audio component 610, an input/output (I/O) interface 612, a sensor component 614 and a communication component 616.

The processing component 602 generally controls the overall operations of the apparatus 600, for example, display, phone call, data communication, camera operation and recording operation. The processing component 602 may include one or more processors 618 to execute instructions to perform all or part of the steps in the above described methods. In addition, the processing component 602 may include one or more modules to facilitate the interaction between the processing component 602 and other components. For example, the processing component 602 may include a multimedia module to facilitate the interaction between the multimedia component 608 and the processing component 602.

The memory 604 may be configured to store various types of data to support the operation performed on the apparatus 600. Examples of such data include instructions for any applications or methods operated on the apparatus 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power supply management system, one or more power sources, and any other components associated with the generation, management, and distribution of power in the apparatus 600.

The multimedia component 608 includes a screen providing an output interface between the apparatus 600 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive external multimedia data while the apparatus 600 is in an operation mode, such as a photographing mode or a video mode. Each of the front camera and the rear camera may be a fixed optical lens system or have focus and optical zoom capability.

The audio component 610 may be configured to output and/or input audio signals. For example, the audio component 610 includes a microphone (MIC) configured to receive an external audio signal when the apparatus 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the apparatus 600. For instance, the sensor component 614 may detect an open/closed status of the apparatus 600, relative positioning of components, e.g., the display and the keypad, of the apparatus 600, a change in position of the apparatus 600 or a component of the apparatus 600, a presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor or a temperature sensor.

The communication component 616 may be configured to facilitate wired or wireless communication between the apparatus 600 and other devices. The apparatus 600 can access a wireless network based on a communication standard, such as WiFi, 2G, or 3G, or a combination thereof. In one exemplary embodiment, the communication component 616 receives a broadcast signal or broadcast related information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 600 may be implemented with one or more application specific integrated circuits (ASIC), digital signal processors (DSP), digital signal processing devices (DSPD), programmable logic devices (PLD), field programmable gate arrays (FPGA), controllers, micro-controllers, microprocessors, or other electronic components, for performing the above color gamut mapping methods.

In exemplary embodiments, there is also provided a non-transitory computer-readable storage medium including instructions, such as included in the memory 604, executable by the processor 618 of the apparatus 600, for performing the above-described color gamut mapping methods. For example, the non-transitory computer-readable storage medium may be a ROM, a RAM, a CD-ROM, a magnetic tape, a floppy disc, an optical data storage device, and the like.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors. Sometimes, terms "module," "sub-module," "unit," or "sub-unit" may refer to a circuitry or a circuit that may be designed to perform certain functions.

Other embodiments of the disclosure may be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A color gamut mapping method, comprising:
   acquiring at least one color gamut type tag for at least one layer, wherein the color gamut type tag is added when the at least one layer is generated;
   determining at least one color gamut corresponding to the at least one layer based on the at least one color gamut type tag;
   mapping the at least one layer to the at least one corresponding color gamut, wherein mapping includes:
      acquiring a superimposing order of the at least one layer;
      marking at least one respective effective displaying area of the at least one layer, in accordance with the superimposing order, wherein the effective displaying area of each layer represents the area of the at least one layer that is not covered by one or more of the other layers in accordance with the superimposing order; and
      mapping the at least one respective effective displaying area of the at least one layer to the at least one corresponding color gamut; and
   superimposing the at least one layer that is mapped to the at least one corresponding color gamut so as to form and output an image to be displayed, wherein superimposing includes:
      superimposing the at least one layer in accordance with the superimposing order so as to obtain the image to be displayed; and
      outputting the image to be displayed to a display screen for displaying.

2. The method according to claim 1, wherein acquiring the color gamut type tag for the at least one layer wherein the color gamut type tag is added when the at least one layer is generated, comprises:
   acquiring the at least one layer generated by an application and the color gamut type tag corresponding to the at least one layer, wherein the color gamut type tag is a tag added when the application generates the at least one layer.

3. The method according to claim 1, wherein acquiring the color gamut type tag for the at least one layer, wherein the color gamut type tag is added when the at least one layer is generated, comprises:
   acquiring the at least one layer generated by an application and the color gamut type tag corresponding to the at least one layer, wherein the color gamut type tag is a tag added when the application generates the at least one layer.

4. The method according to claim 1, wherein acquiring the color gamut type tag for the at least one layer, wherein the color gamut type tag is added when the at least one layer is generated, comprises:
   acquiring the at least one layer generated by an application and the color gamut type tag corresponding to the at least one layer, wherein the color gamut type tag is a tag added when the application generates the at least one layer.

5. The method according to claim 1, further comprising:
   detecting whether a condition for starting a function of automatic color gamut mapping is satisfied, wherein the condition for starting the function of automatic color gamut mapping includes at least one of the following conditions: when an appointed application starts, and when the function of automatic color gamut mapping is set to be enabled by a user, and wherein the color gamut type tag for the at least one layer is acquired, if the starting condition is satisfied.

6. The method according to claim 1, further comprising:
   detecting whether a condition for starting a function of automatic color gamut mapping is satisfied, wherein the condition for starting the function of automatic color gamut mapping includes at least one of the following conditions: when an appointed application starts, and when the function of automatic color gamut mapping is set to be enabled by a user, and wherein the color gamut type tag for the at least one layer is acquired, if the starting condition is satisfied.

7. The method according to claim 1, further comprising:
   detecting whether a condition for starting a function of automatic color gamut mapping is satisfied, wherein the condition for starting the function of automatic color gamut mapping includes at least one of the following conditions: when an appointed application starts, and when the function of automatic color gamut mapping is set to be enabled by a user, and wherein the color gamut type tag for the at least one layer is acquired if the starting condition is satisfied.

8. A color gamut mapping apparatus, comprising:
a processor; and
a memory storing instructions executable by the processor,
wherein the processor is configured to:
acquire at least one color gamut type tag for at least one layer, wherein the color gamut type tag is added when the at least one layer is generated;
determine at least one color gamut corresponding to the at least one layer based on the at least one color gamut type tag;
map the at least one layer to the at least one corresponding color gamut, and
is further configured to:
acquire a superimposing order of the at least one layer;
mark at least one respective effective displaying area of the at least one layer in accordance with the superimposing order, wherein the effective displaying area of each layer represents the area of the at least one layer that is not covered by one or more of the other layers in accordance with the superimposing order; and
map the at least one respective effective displaying area of the at least one layer to the at least one corresponding color gamut; and
superimpose the at least one layer that is mapped to the at least one corresponding color gamut so as to form and output an image to be displayed, and is further configured to:
superimpose the at least one layer in accordance with the superimposing order so as to obtain the image to be displayed; and
output the image to be displayed to a display screen for displaying.

9. The apparatus according to claim 8, wherein the processor configured to acquire the color gamut type tag of the layer, wherein the color gamut type tag is added when the at least one layer is generated, is further configured to:
acquire the at least one layer generated by an application and the color gamut type tag corresponding to the at least one layer wherein the color gamut type tag is a tag added when the application generates the at least one layer.

10. The apparatus according to claim 8, wherein the processor is further configured to:
detect whether a condition for starting a function of automatic color gamut mapping is satisfied, wherein the condition for starting the function of automatic color gamut mapping includes at least one of the following conditions: when an appointed application starts, and when the function of automatic color gamut mapping is set to be enabled by a user, and wherein the color gamut type tag for the at least one layer is acquired if the starting condition is satisfied.

11. A non-transitory computer-readable storage medium having stored therein instructions that, when executed by a processor of a mobile terminal, cause the mobile terminal to perform:
acquiring at least one color gamut type tag for at least one layer, wherein the color gamut type tag is added when the at least one layer is generated;
determining at least one color gamut corresponding to the at least one layer, based on the at least one color gamut type tag;
mapping the at least one layer to the at least one corresponding color gamut, and further includes:
acquiring a superimposing order of the at least one layer;
marking at least one respective effective displaying area of the at least one layer, in accordance with the superimposing order, wherein the effective displaying area of each layer represents the area of the at least one layer that is not covered by one or more of the other layers in accordance with the superimposing order; and
mapping the at least one respective effective displaying area of the at least one layer to the at least one corresponding color gamut; and
superimposing the at least one layer that is mapped to the at least one corresponding color gamut so as to form and output an image to be displayed, and further includes:
acquiring a superimposing order of the at least one layer;
marking at least one respective effective displaying area of the at least one layer, in accordance with the superimposing order; and
mapping the at least one respective effective displaying area of the at least one layer to the at least one corresponding color gamut.

12. The storage medium according to claim 11, wherein the instructions caused the processor to perform acquiring the color gamut type tag for the at least one layer, wherein the color gamut type tag is added when the at least one layer is generated, comprise the instructions to cause the processor to further perform:
acquiring the at least one layer generated by an application and the color gamut type tag corresponding to the at least one layer, wherein the color gamut type tag is a tag added when the application generates the at least one layer.

13. The storage medium according to claim 11, wherein the storage medium stores the instructions to cause the processor to further perform:
detecting whether a condition for starting a function of automatic color gamut mapping is satisfied, wherein the condition for starting the function of automatic color gamut mapping includes at least one of the following conditions: when an appointed application starts, and when the function of automatic color gamut mapping is set to be enabled by a user, and wherein the color gamut type tag of the at least one layer is acquired if the starting condition is satisfied.

* * * * *